United States Patent
Oishi et al.

(10) Patent No.: US 8,351,603 B2
(45) Date of Patent: Jan. 8, 2013

(54) RANDOM NUMBER GENERATING DEVICE, RANDOM NUMBER GENERATING METHOD, AND SECURITY CHIP

(75) Inventors: Yuki Oishi, Kanagawa (JP); Yutaka Higo, Kanagawa (JP); Hiroshi Kano, Kanagawa (JP); Masanori Hosomi, Tokyo (JP); Hiroyuki Ohmori, Kanagawa (JP); Kazutaka Yamane, Kanagawa (JP); Kazuhiro Bessho, Kanagawa (JP)

(73) Assignee: Sony Corporation, Tokyo (JP)

( * ) Notice: Subject to any disclaimer, the term of this patent is extended or adjusted under 35 U.S.C. 154(b) by 253 days.

(21) Appl. No.: 12/943,476

(22) Filed: Nov. 10, 2010

(65) Prior Publication Data

US 2011/0123022 A1 May 26, 2011

(30) Foreign Application Priority Data

Nov. 24, 2009 (JP) ................. P2009-266629

(51) Int. Cl.
*H04L 9/00* (2006.01)
*H04L 9/32* (2006.01)
(52) U.S. Cl. ............. 380/46; 380/47; 380/268; 713/178
(58) Field of Classification Search .................. 380/46, 380/47, 268; 713/178
See application file for complete search history.

(56) References Cited

FOREIGN PATENT DOCUMENTS
JP 2008-310403 12/2008

OTHER PUBLICATIONS

Investigation Research Report Concerning, "Security Evaluation of System LSI Chip", Mar. 31, 2004.
J.Z. Sun, Phys. Rev. B. vol. 62, p. 570, 2000.

*Primary Examiner* — Mohammad W Reza
(74) *Attorney, Agent, or Firm* — K&L Gates LLP

(57) ABSTRACT

A random number generating device includes: a random number generator configured to have a plurality of random number generating elements that generate a random number in response to supply of a spin-injection current; and a temperature controller.

9 Claims, 8 Drawing Sheets

RANDOM NUMBER GENERATING DEVICE, RANDOM NUMBER GENERATING METHOD, AND SECURITY CHIP

CROSS REFERENCES TO RELATED APPLICATIONS

The present application claims priority to Japanese Priority Patent Application JP 2009-266629 filed in the Japan Patent Office on Nov. 24, 2009, the entire content of which is hereby incorporated by reference.

BACKGROUND

The present application relates to a random number generating device, a random number generating method, and a security chip that are suitable to be applied to e.g. the case in which a spin-injection current is injected into a spin-injection magnetization reversal element to thereby generate a random number and allow this generated random number to be less readily read by an attacker.

There have been provided security chips that are allowed to have higher confidentiality through encryption of data by use of various kinds of encryption systems. For the security chip, it is required to enhance the tamper resistance to thereby prevent an attacker from reading out an encryption key stored in the chip. To meet this requirement, spin-injection magnetization reversal is increasingly employed as a technique to generate a random number used for an encryption key in a security chip and make this random number be less readily read out.

Japanese Patent Laid-open No. 2008-310403 (hereinafter, patent document 1) makes a proposal about a physical random number generating device employing a spin-injection magnetization reversal phenomenon (hereinafter, abbreviated as the "spin-injection phenomenon") caused by injection of a spin-injection current (referred to also as the spin-polarized current) into a magnetic material. This random number generating device utilizes the characteristic that the occurrence probability of the spin-injection phenomenon is determined by the injection current based on the statistical physics as shown in J. Z. Sun, Phys. Rev. B, Vol. 62, p. 570, 2000 (hereinafter, non-patent document 1). In the random number generating device employing the spin-injection magnetization reversal, a truly random number can be generated in principle by taking advantage of this physical characteristic.

In Report on Evaluation Study about "System LSI no Security Hyouka," Survey Commissioned by the Ministry of Economy, Trade and Industry of Japan, http://www.meti.go.jp/policy/netsecurity/downloadfiles/lsi.pdf (hereinafter, non-patent document 2), security requirements for a system LSI chip are described.

SUMMARY

However, as shown in non-patent document 1, the spin-injection current that provides ½ as the reversal probability depends also on the environmental temperature and the applied magnetic field. Thus, the spin-injection current needs to be set in matching with the actual use environment.

$$I_c = \frac{1}{\eta}\left(\frac{2e}{\hbar}\right)\frac{\alpha}{|\cos\phi|}(\alpha^2 l_m H_k M_s)\left(1 + \frac{2\pi M_s}{H_k} + \frac{H}{H_k}\right) \quad (1)$$

In expression (1), Ic denotes the spin-injection current that provides ½ as the reversal probability. H denotes the applied magnetic field. Ms denotes the saturation magnetization of the recording magnetic layer and indicates the existence of a temperature dependency.

If the spin-injection phenomenon is used for the random number generating device, a truly random number is obtained when driving is carried out at the operating point at which the reversal probability of the spin-injection magnetization reversal element (hereinafter, abbreviated as the "reversal probability") is strictly ½. Even when the reversal probability is deviated from ½, a 1-bit truly random number can be obtained by calculation from consecutive 2 bits, as described in patent document 1. However, if the reversal probability greatly differs from ½, it is impossible to generate a random number extremely close to a truly random number, and thus the speed of random number generation is greatly lowered.

Furthermore, the random number generating device based on the spin-injection phenomenon generally employs a scheme of setting the saturation magnetization Ms low to thereby reduce the spin-injection current in order to suppress the power consumption. However, in the case of the material whose saturation magnetization Ms is low, variation of the saturation magnetization Ms with temperature also often tends to be large. As a result, variation of the spin-injection current with temperature is liable to be large. Therefore, it is difficult to set the reversal probability to ½ if the spin-injection current greatly changes depending on the temperature.

Moreover, as shown in non-patent document 2, a random number generated by the random number generating device included in a security chip serves as the seed of an encryption key and therefore must not be easily read out. However, the random number generating device employing the spin-injection phenomenon uses "0" and "1" obtained from a spin-injection magnetization reversal element of the resistive type (for example, data is defined as "0" when the resistance of the element is high, and data is defined as "1" when the resistance is low) as a random number. Therefore, there is a possibility that the key is stolen through check of the power consumption of the random number generating device. Furthermore, if where the random number generating device is disposed on the security chip is found, possibly the random number is read out by the following method, although this method is more difficult than the method based on the check of the power consumption. Specifically, for example, an attacker reads out the random number by removing the upper passivation layer formed on the chip and performing physical probing.

In addition, in order to prevent a random number generated by the random number generating device from being read out by an attacker, various measures such as insertion of a pseudo signal and use of a complex structure for making it hard to find where the random number generator exists are employed as disclosed in non-patent document 2. However, if these measures are employed, the security chip needs to have an extra structure, which leads to a cost increase. However, if the security is not enhanced and an encryption key is stolen by an attacker, encrypted data is immediately cracked and thus the use as the security chip is impossible.

There is a need for the present application to prevent a random number generated by a random number generating element from being easily read out by an attacker.

According to an embodiment, there is provided a random number generating device. The random number generating device includes a random number generator configured to have a plurality of random number generating elements that generate a random number through setting of reversal probability of magnetization to ½ due to a spin-injection phenomenon in response to supply of a spin-injection current, the random number generator making the random number generating element generate the random number by performing first writing of supplying the random number generating element with the spin-injection current that provides 1 as writing probability and sets a resistance value of the random number generating element to a first resistance value higher than a predetermined threshold, and performing first reading of reading out the resistance value of the random number generating element, and performing second writing of supplying the random number generating element with the spin-injection current that provides ½ as writing probability and sets the resistance value of the random number generating element to a second resistance value lower than the predetermined threshold if setting of the random number generating element to the first resistance value by the first writing is detected from the resistance value that is read out. The random number generating device further includes a temperature controller configured to obtain an environmental temperature of an environment under which the random number generating element generates a random number based on the resistance value of the random number generating element, read out by the first reading, and make magnitude of the spin-injection current be so changed as to follow the environmental temperature to make the random number generator perform the second writing.

According to another embodiment, there is provided a random number generating method including a step of preparing a plurality of random number generating elements that generate a random number through setting of reversal probability of magnetization to ½ due to a spin-injection phenomenon in response to supply of a spin-injection current, and making the random number generating element generate the random number by performing first writing of supplying the random number generating element with the spin-injection current that provides 1 as writing probability and sets a resistance value of the random number generating element to a first resistance value higher than a predetermined threshold, and performing first reading of reading out the resistance value of the random number generating element, and performing second writing of supplying the random number generating element with the spin-injection current that provides ½ as writing probability and sets the resistance value of the random number generating element to a second resistance value lower than the predetermined threshold if setting of the random number generating element to the first resistance value by the first writing is detected from the resistance value that is read out. The random number generating method further includes a step of obtaining an environmental temperature of an environment under which the random number generating element generates a random number based on the resistance value of the random number generating element, read out by the first reading, and making magnitude of the spin-injection current be so changed as to follow the environmental temperature to make a random number generator perform the second writing.

According to further embodiment, there is provided a security chip including a random number generator configured to have a plurality of random number generating elements that generate a random number through setting of reversal probability of magnetization to ½ due to a spin-injection phenomenon in response to supply of a spin-injection current, the random number generator making the random number generating element generate the random number by performing first writing of supplying the random number generating element with the spin-injection current that provides 1 as writing probability and sets a resistance value of the random number generating element to a first resistance value higher than a predetermined threshold, and performing first reading of reading out the resistance value of the random number generating element, and performing second writing of supplying the random number generating element with the spin-injection current that provides ½ as writing probability and sets the resistance value of the random number generating element to a second resistance value lower than the predetermined threshold if setting of the random number generating element to the first resistance value by the first writing is detected from the resistance value that is read out. The security chip further includes a temperature controller configured to obtain an environmental temperature of an environment under which the random number generating element generates a random number based on the resistance value of the random number generating element, read out by the first reading, and make magnitude of the spin-injection current be so changed as to follow the environmental temperature to make the random number generator perform the second writing. The security chip further includes a cryptographic processor configured to use the random number generated by the random number generator as a pseudo random number and encrypt data by the pseudo random number based on a predetermined encryption system; and a memory configured to have a plurality of storage elements for storing the encrypted data.

According to an embodiment, whether the reset of the random number generating element is correctly performed can be checked by reading out data after performing the first writing to reset the random number generating element. Furthermore, in the case of supplying the random number generating element with the spin-injection current that provides ½ as the writing probability after checking that the reset has been performed, the magnitude of the spin-injection current is so changed as to follow the environmental temperature. This provides an advantageous effect that a stable random number extremely close to a truly random number is obtained even when the environmental temperature involves change.

Additional features and advantages are described herein, and will be apparent from the following Detailed Description and the figures.

DETAILED DESCRIPTION

The best mode for carrying out the present application (hereinafter, referred to as the embodiment) will be described below. The order of the description is as follows.

1. One Embodiment (writing Control: example in which spin-injection current is changed depending on temperature change)

2. Modification Example

1. One Embodiment

[Example in which spin-injection current is changed depending on temperature change]

One embodiment will be described below with reference to FIGS. 1A to 8. This embodiment relates to an example of application to a security chip 1 that generates a random number through injection of a spin-injection current and stores this random number.

Figure 1A:
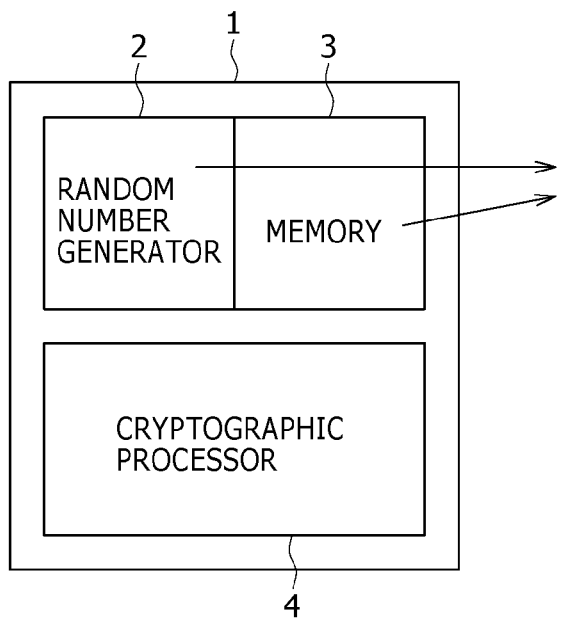
FIGS. 1A and 1B are configuration diagrams showing an internal configuration example of a security chip according to one embodiment and an example of the planar arrangement of random number generating elements and storage elements.
Figure 1B:
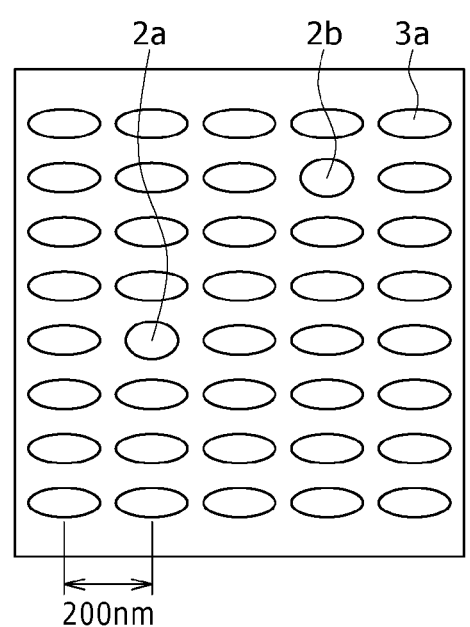

FIGS. 1A and 1B show an internal configuration example of the security chip 1 and an example of the planar arrangement of random number generating elements 2a and 2b and a storage element 3a, respectively.

FIG. 1A shows the internal configuration example of the security chip 1.

The security chip 1 includes a random number generator 2 that generates a random number, a non-volatile memory 3 that stores the generated random number and encrypted data, and a cryptographic processor 4 that executes data encryption processing and so forth by using the generated random number. In some cases, the random number generator 2 is used as an independent random number generating device separately from the cryptographic processor 4.

The random number generated by the random number generator 2 is stored in the memory 3 as the seed of a pseudo random number. The cryptographic processor 4 reads out this random number from the memory 3 to use it as a pseudo random number, and performs amplification to generate a physical random number. The cryptographic processor 4 encrypts data by this physical random number based on a predetermined encryption system (RSA or the like), and writes the encrypted data to the memory 3.

FIG. 1B shows the example of the planar arrangement of the random number generating elements 2a and 2b and the storage element 3a.

The random number generator 2 includes the plural random number generating elements 2a and 2b that generate a random number through setting of the reversal probability of magnetization to ½ due to the spin-injection phenomenon in response to supply of a spin-injection current. The memory 3 includes the plural storage elements 3a that store data. As the random number generating elements 2a and 2b and the storage element 3a, a spin-injection magnetization reversal element in which magnetization reversal occurs in response to injection of the spin-injection current is used. As this spin-injection magnetization reversal element, a magnetoresistance effect element, whose resistance value changes through magnetization reversal in response to the supply of the spin-injection current, such as a giant magnetoresistance effect element (GMR element) or a tunnel magnetoresistance effect element (TMR element), is used. An example of the film configuration of the random number generating elements 2a and 2b and the storage element 3a will be described later with FIG. 2.

The shape of the random number generating elements 2a and 2b is an ellipse whose minor axis and major axis have lengths of 80 nm and 140 nm, respectively. The shape of the storage element 3a is an ellipse whose minor axis and major axis have lengths of 80 nm and 160 nm, respectively. The storage elements 3a and the random number generating elements 2a and 2b are randomly disposed inside the memory 3, and the distance among the respective elements is set to about 200 nm.

The aspect ratio of the elliptical shape of the random number generating elements 2a and 2b is lower than the aspect ratio of the elliptical shape of the storage element 3a. In general, when the aspect ratio of the spin-injection magnetization reversal element is high, the performance of holding information is high, but a large current is necessary to store data in the element. However, by decreasing the aspect ratio of the elliptical shape of the random number generating elements 2a and 2b, data can be easily rewritten even with a small current, and generation of a random number is facilitated.

As described above, if the places of the random number generating elements 2a and 2b are identified, possibly a generated random number is stolen by intentionally causing the malfunction of the random number generating elements 2a and 2b or removing the cap layer (see FIG. 2 to be described later) and bringing a probe in direct contact with an interconnect. Therefore, an attacker is prevented from getting to know where the random number generating elements 2a and 2b exist in the security chip 1 as much as possible. The memory 3 of the present example is composed of the plural storage elements 3a that can store information of several kilobits to several hundreds of megabits, and it is almost impossible to find, among the storage elements 3a, the random number generating elements 2a and 2b that store only information of several bits. Furthermore, it is also possible to allow the random number generating elements 2a and 2b and the storage element 3a to have the same size. Therefore, it will be impossible to find the random number generating elements 2a and 2b by methods other than a method of discriminating the random number generating elements 2a and 2b and the storage element 3a based on interconnects. Consequently, configuring the random number generator 2 and the memory 3 like those in the security chip 1 of the present example is very effective in terms of security enhancement.

Figure 2:
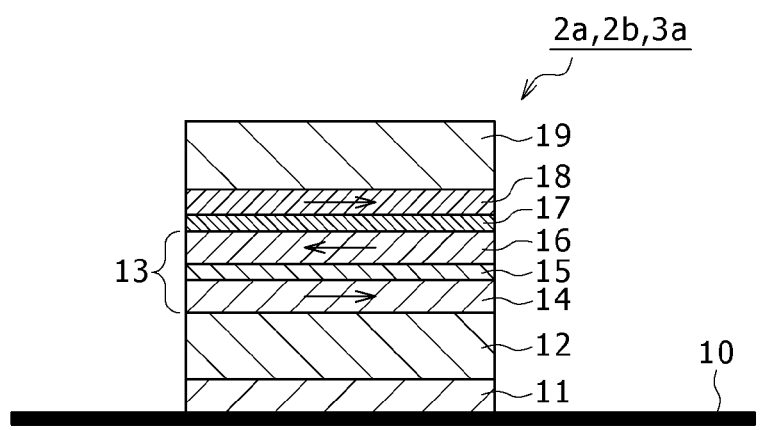
FIG. 2 is a schematic sectional view of the stacked films of a TMR element used as one example of a spin-injection magnetization reversal element used as the random number generating element in the embodiment.

FIG. 2 is a schematic sectional view of the stacked films of a TMR element used as one example of the spin-injection magnetization reversal element used as the random number generating elements 2a and 2b and the storage element 3a.

The stacked films of the TMR element are composed of base layer/antiferromagnetic layer/magnetization pinned layer/tunnel barrier layer/signal detecting layer/cap layer. The random number generating elements 2a and 2b and the storage element 3a of the present example are fabricated by continuously forming, over a substrate 10, a base layer 11, an antiferromagnetic layer 12, a magnetization pinned layer 13, a tunnel barrier layer 17, a recording layer 18, and a cap layer 19 in that order from the side of the substrate 10 in vacuum apparatus.

In the present example, the magnetization pinned layer 13 is composed of magnetic layers 14 and 16 that are vertically arranged and antiferromagnetically coupled to each other, and a conductive layer 15 sandwiched between the magnetic layers 14 and 16. However, a single layer composed of a ferromagnetic material can also be used as the magnetization pinned layer 13. For the magnetic layers 14 and 16 forming the magnetization pinned layer, an alloy material composed of one kind or two or more kinds among Fe, Ni, and Co can be used. Furthermore, the alloy of these magnetic layers may contain a transition metal element such as Nb and Zr, a light element such as B and C, rare earth elements such as Gd, Tb, and Y, and Mn, Al, Cr, or the like as a Heusler alloy. In addition, an oxide or a nitride of these materials can also be used.

As the material of the conductive layer 15 used in the magnetization pinned layer 13, a material that causes antiferromagnetic interlayer coupling between magnetic layers, such as Ru, Cu, Rh, and Cr, can be used. As the material of the tunnel barrier layer 17, a material such as $Al_2O_3$, MgO, HfO, SiO, $SiO_2$, and SiN or a mixture of these materials can be used. As the material of the antiferromagnetic layer, an Mn compound such as PtMn, RhMn, RuMn, FeMn, and IrMn, or another material can be used.

As the ferromagnetic material of the recording layer 18, the same kind of material as that of the material of the magnetic layer 14 forming the magnetization pinned layer can be used. Specifically, for example, an alloy material composed of one kind or two or more kinds among Fe, Ni, and Co, and any of these magnetic alloys containing the above-described additive can be used. Although there is no particular limit to the materials of the base layer 11 and the cap layer 19, a metal or a metal nitride such as Ta, Cr, Ti, W, Al, Cu, TiN, and CuN can be used in general.

Figure 3:
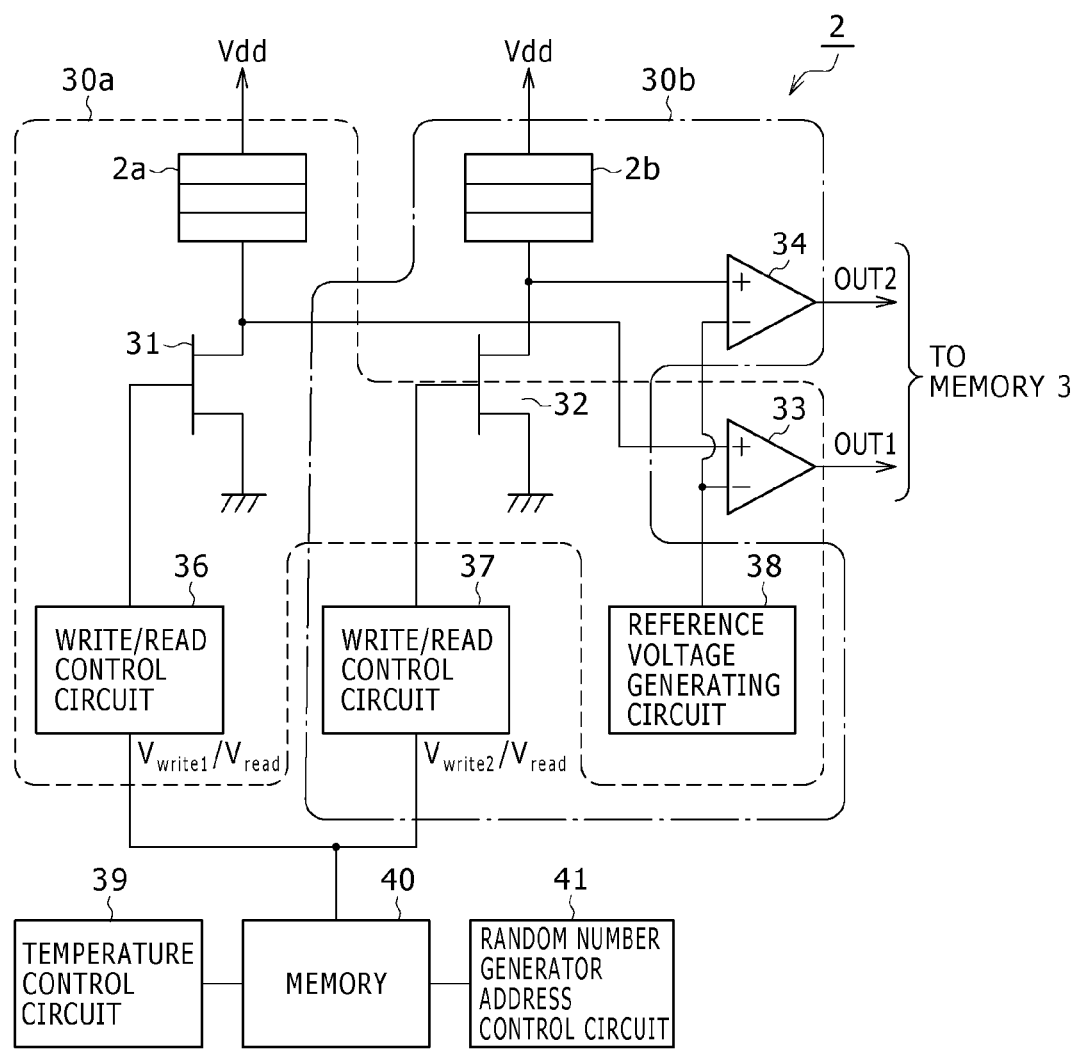
FIG. 3 is a block diagram showing an internal configuration example of a random number generator in the security chip of the embodiment.

FIG. 3 shows an internal configuration example of the random number generator 2.

The description with FIG. 3 will be so made that peripheral circuits that are configured for the random number generating elements 2a and 2b and generate a random number are treated as random number generating circuits 30a and 30b, respectively, for convenience. The random number generating circuits 30a and 30b include the random number generating elements 2a and 2b and drive transistors 31 and 32 that apply voltage to the random number generating elements 2a and 2b and supply a spin-injection current. Furthermore, the random number generating circuits 30a and 30b include sense amplifier circuits 33 and 34 that amplify a random number read out from the random number generating elements 2a and 2b and output the amplified random number to the memory 3. The sense amplifier circuits 33 and 34 are used for reading of information (e.g. random number).

The random number generating circuits 30a and 30b include write/read control circuits 36 and 37 that control the operation of the drive transistors 31 and 32, and a reference voltage generating circuit 38 that supplies a reference voltage to the sense amplifier circuits 33 and 34. In the present example, the random number generating circuits 30a and 30b are so configured that the group of the random number generating element, the drive transistor, the reference voltage generating circuit, and the sense amplifier circuit is treated as one unit.

The random number generator 2 includes a non-volatile memory 40 that stores the values of the voltage and the spin-injection current in writing or reading, applied to the random number generating elements 2a and 2b by the drive transistors 31 and 32. Furthermore, the random number generator 2 includes a temperature control circuit 39 that makes the memory 40 store the values of proper voltage and spin-injection current to be written to the random number generating elements 2a and 2b depending on the temperature of the external environment. The temperature control circuit 39 is used also as a temperature controller that makes the magnitude of the spin-injection current be so changed as to follow the temperature of the external environment. Moreover, the random number generator 2 includes a random number generator address control circuit 41 that controls the addresses of the random number generating elements 2a and 2b and writes the addresses to the memory 40.

The random number generating circuits 30a and 30b perform first writing of supplying the random number generating elements 2a and 2b with the spin-injection current that provides 1 as the writing probability and sets the resistance values of the random number generating elements 2a and 2b to a first resistance value higher than a predetermined threshold. Thereafter, the random number generating circuits 30a and 30b perform first reading of reading out the resistance values of the random number generating elements 2a and 2b. Next, if the random number generating circuits 30a and 30b detect, from the read resistance values, that the random number generating elements 2a and 2b are set to the first resistance value (higher-side resistance) by the first writing, the random number generating circuits 30a and 30b carry out the following operation. Specifically, they perform second writing of supplying the random number generating elements 2a and 2b with the spin-injection current that provides ½ as the writing probability and sets the resistance values of the random number generating elements 2a and 2b to a second resistance value lower than the predetermined threshold, to thereby make the random number generating elements 2a and 2b generate a random number.

The film configuration of the random number generating elements 2a and 2b is as follows. Specifically, they are composed of Ta (3 nm)/Cu (50 nm)/PtMn (20 nm)/CoFe (2 nm)/Ru (0.8 nm)/CoFeB (4 nm)/Mg (0.9 nm)/CoFeB (2 nm)/Ta (5 nm). Both of the random number generating elements 2a and 2b are an elliptical element whose minor axis and major axis have lengths of 80 nm and 140 nm, respectively. That is, they have an element size slightly smaller than that of the storage element 3a, whose minor axis and major axis have lengths of 80 nm and 160 nm, respectively. The major axes of the random number generating elements 2a and 2b and the storage element 3a are so arranged as to be in parallel to each other (see FIG. 1).

The drive transistor 31 and the sense amplifier circuit 33 are connected to the random number generating element 2a, and the drive transistor 32 and the sense amplifier circuit 34 are connected to the random number generating element 2b. The outputs (random numbers) of two sense amplifier circuits 33 and 34 are simultaneously output to the memory 3. In this manner, writing/reading is performed by using the drive transistors 31 and 32 and the write/read control circuits 36 and 37, which are independent for each of the random number generating elements 2a and 2b. Thus, the voltage and the spin-injection current having values different for each of the random number generating elements 2a and 2b can be applied.

The operation of writing and reading for the random number generating element 2a by the drive transistor 31 is controlled by the write/read control circuit 36. The operation of writing and reading for the random number generating element 2b by the drive transistor 32 is controlled by the write/read control circuit 37. The following writing test of the write/read control circuits 36 and 37 is performed in order to apply such a voltage that the writing probability of the random number generating elements 2*a* and 2*b* is set to about ½ to the random number generating elements 2*a* and 2*b*.

After the random number generating elements 2*a* and 2*b* are fabricated, test of reset-writing-reading is so repeatedly performed that the number of times of writing is set to about $10^3$ to $10^8$. After this test, the writing voltages to the random number generating elements 2*a* and 2*b* are stored in the memory 40. Thus, the value of the spin-injection current that provides ½ as the reversal probability of the random number generating elements 2*a* and 2*b* is stored in the memory 40 in advance. When the random number generating elements 2*a* and 2*b* generate a random number actually, the write/read control circuits 36 and 37 read out information on the writing voltages for the respective elements, stored in the memory 40 in the initial state, and the value of the spin-injection current that aligns the reversal probability of the random number generating elements 2*a* and 2*b* with about ½. Next, the write/read control circuits 36 and 37 adjust the application voltage to the drive transistors 31 and 32 by using the information, and perform writing by supplying the spin-injection current to the plural random number generating elements 2*a* and 2*b* with such a voltage that the writing probability of the random number generating elements 2*a* and 2*b* is set to about ½. This makes it possible to make the random number generating elements 2*a* and 2*b* generate a random number.

Furthermore, the write/read control circuits 36 and 37 control the drive transistors 31 and 32 and thereby the voltage values read out from the random number generating elements 2*a* and 2*b* are supplied to the sense amplifier circuits 33 and 34. For example, when the random number generating elements 2*a* and 2*b* have lower-side resistance, the reference voltage generating circuit 38 supplies the sense amplifier circuits 33 and 34 with the voltage value achieved by multiplying the voltage value obtained from the value of this lower-side resistance by 1.2 as the reference voltage. This makes it possible to determine whether the random number generating elements 2*a* and 2*b* are in the high resistance state or the low resistance state by using the reference voltage as the threshold.

The information on the writing voltages to the random number generating elements 2*a* and 2*b*, stored in the memory 40, may be either information on the voltages actually applied to the random number generating elements 2*a* and 2*b* or information on the voltages applied in a stepwise manner. As part of the sense amplifier circuits 33 and 34 and the write/read control circuits 36 and 37, the same circuit is used in the random number generator 2 and the memory 3.

The temperature control circuit 39 obtains the temperature of the external environment by reading out the value of the spin-injection current that is stored in the memory 40 by the write/read control circuits 36 and 37 and obtained from the writing/reading voltages to the random number generating elements 2*a* and 2*b* (see FIG. 6 to be described later). Based on the temperature of the external environment, the temperature control circuit 39 obtains the values of the optimum spin-injection current and voltage for setting the writing probability to ½ for the random number generating elements 2*a* and 2*b*, and stores these values in the memory 40. Specifically, the temperature control circuit 39 obtains the environmental temperature of the environment under which the random number generating elements 2*a* and 2*b* generate a random number from the resistance value of the random number generating elements 2*a* and 2*b*, read out by the first reading. Furthermore, the temperature control circuit 39 makes the magnitude of the spin-injection current be so changed as to follow the environmental temperature, and makes the random number generating circuits 30*a* and 30*b* perform the second writing. Thus, the write/read control circuits 36 and 37 included in the random number generating circuits 30*a* and 30*b* write data to the random number generating elements 2*a* and 2*b* based on the current and voltage values read out from the memory 40.

The random number generating elements 2*a* and 2*b* have at least two magnetic layers, i.e. the recording layer and the magnetization pinned layer, and an insulating layer or a nonmagnetic conductive layer is disposed between these magnetic layers (see FIG. 2). A current is made to flow to the random number generating elements 2*a* and 2*b* and the storage element 3*a* substantially perpendicularly, to thereby carry out magnetization reversal for the recording layer, i.e. information writing. The probability of the magnetization reversal depends on the magnitude of the spin-injection current made to flow through the spin-injection magnetization reversal element. For example, when the random number generator 2 makes the random number generating elements 2*a* and 2*b* generate a random number, the write/read control circuits 36 and 37 repeatedly carry out the operation of reset-writing-reading. In the reset, the current that provides 1 as the probability of the magnetization reversal is used through adjustment. In the information writing, the current that provides about ½ as the probability of the magnetization reversal is used through adjustment.

When reading out information held by the spin-injection magnetization reversal element, the write/read control circuits 36 and 37 utilize the characteristic that the resistance of the random number generating elements 2*a* and 2*b* depends on the angle of magnetization of the recording layer and the magnetization pinned layer due to the giant magnetoresistance effect or the tunnel magnetoresistance effect. Furthermore, by applying a current sufficiently smaller than the writing current, the write/read control circuits 36 and 37 detect the resistance and make a determination by using the reference resistance value as the threshold. The first resistance value higher than the threshold is referred to as the higher-side resistance, and the second resistance value lower than the threshold is referred to as the lower-side resistance. As described above, this threshold is defined by the reference voltage supplied by the reference voltage generating circuit 38.

When making the random number generating elements 2*a* and 2*b* generate a random number, the write/read control circuits 36 and 37 repeatedly carry out control composed of the combination of writing and reading, such as first writing (reset)-second writing-reading. The random number generator 2 applies the current that provides 1 as the probability of magnetization reversal in the first writing, and applies the current that provides about ½ as the probability of magnetization reversal in the second writing. In addition, the random number generator 2 obtains a random number output by the reading as the final step.

Figure 4:
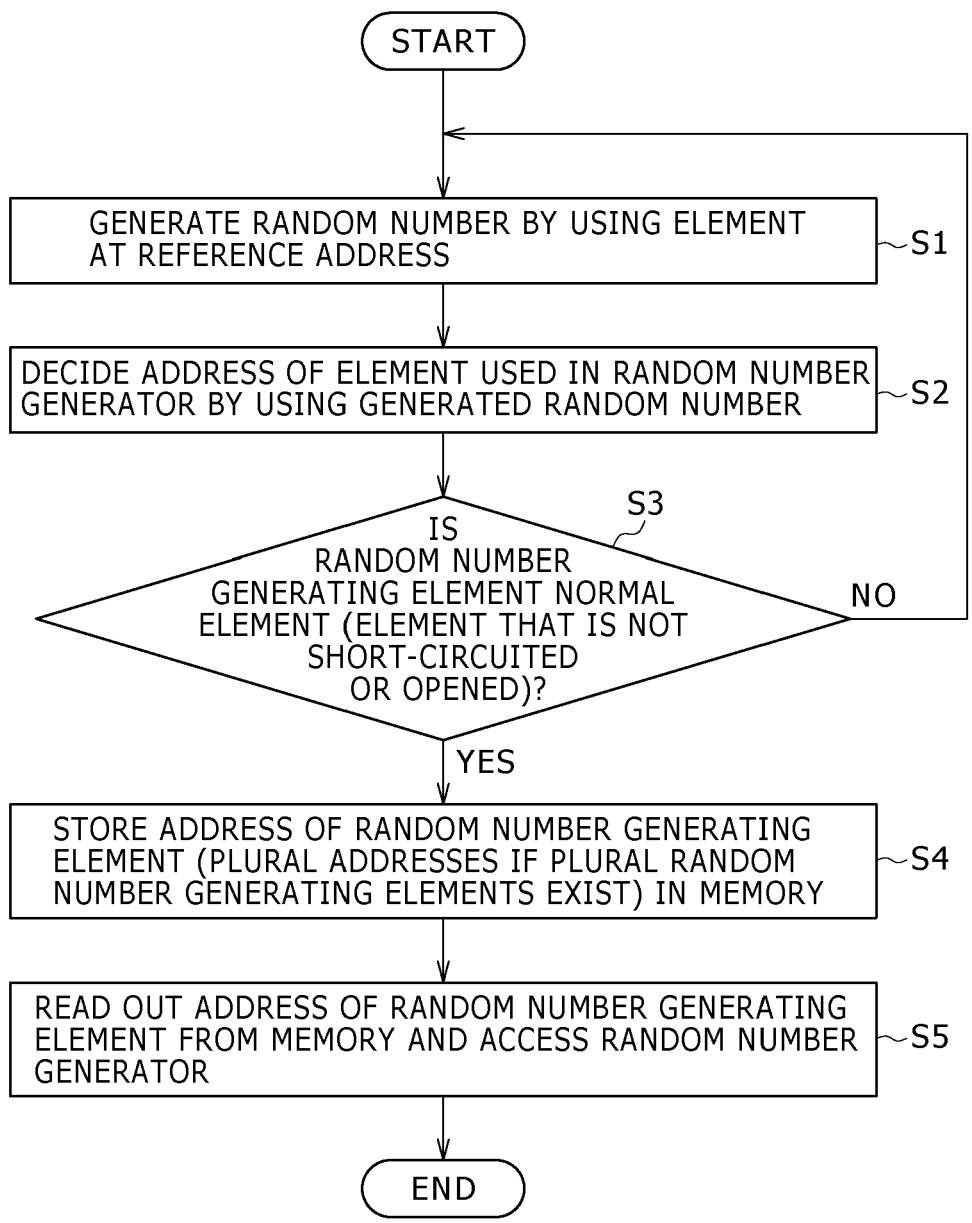
FIG. 4 is a flowchart showing an example of processing of deciding the address of the random number generating element in the embodiment.

FIG. 4 shows an example of processing of deciding the address of the random number generating element 2*a* dotted in the memory 3. In the following, detailed description is omitted about the random number generating element 2*b*, which executes the same processing as that by the random number generating element 2*a*.

First, by using the random number generating element 2*a* disposed at the reference address defined by the random number generator address control circuit 41 in advance, the write/read control circuit 36 generates a random number (step S1).

Next, the random number generator address control circuit 41 decides the address of the random number generating element 2*a* in the random number generator 2 by using the generated random number (step S2). This precludes an attacker from easily getting to know which random number generating element among those disposed inside the memory 3 is used to generate the random number, and thus can enhance the security of the security chip 1 in the random number generation.

Next, the random number generator address control circuit 41 checks whether or not the random number generating element 2a disposed at the decided address is a normal element that is not short-circuited or opened (step S3). If the decided random number generating element 2a is an abnormal element that is short-circuited or opened, the processing is returned to the step S1, where the random number generator address control circuit 41 repeats the processing of deciding the address of the random number generating element 2a again.

If the decided random number generating element 2a is a normal element, the write/read control circuit 36 stores the address of the random number generating element 2a (plural addresses if plural random number generating elements 2a exist) in the memory 40 (step S4). Subsequently, the write/read control circuit 36 reads out the address of the random number generating element 2a from the memory 40, and accesses the random number generating element 2a in the random number generator 2 to execute processing of making the random number generating element 2a generate a random number (step S5).

Figure 5:
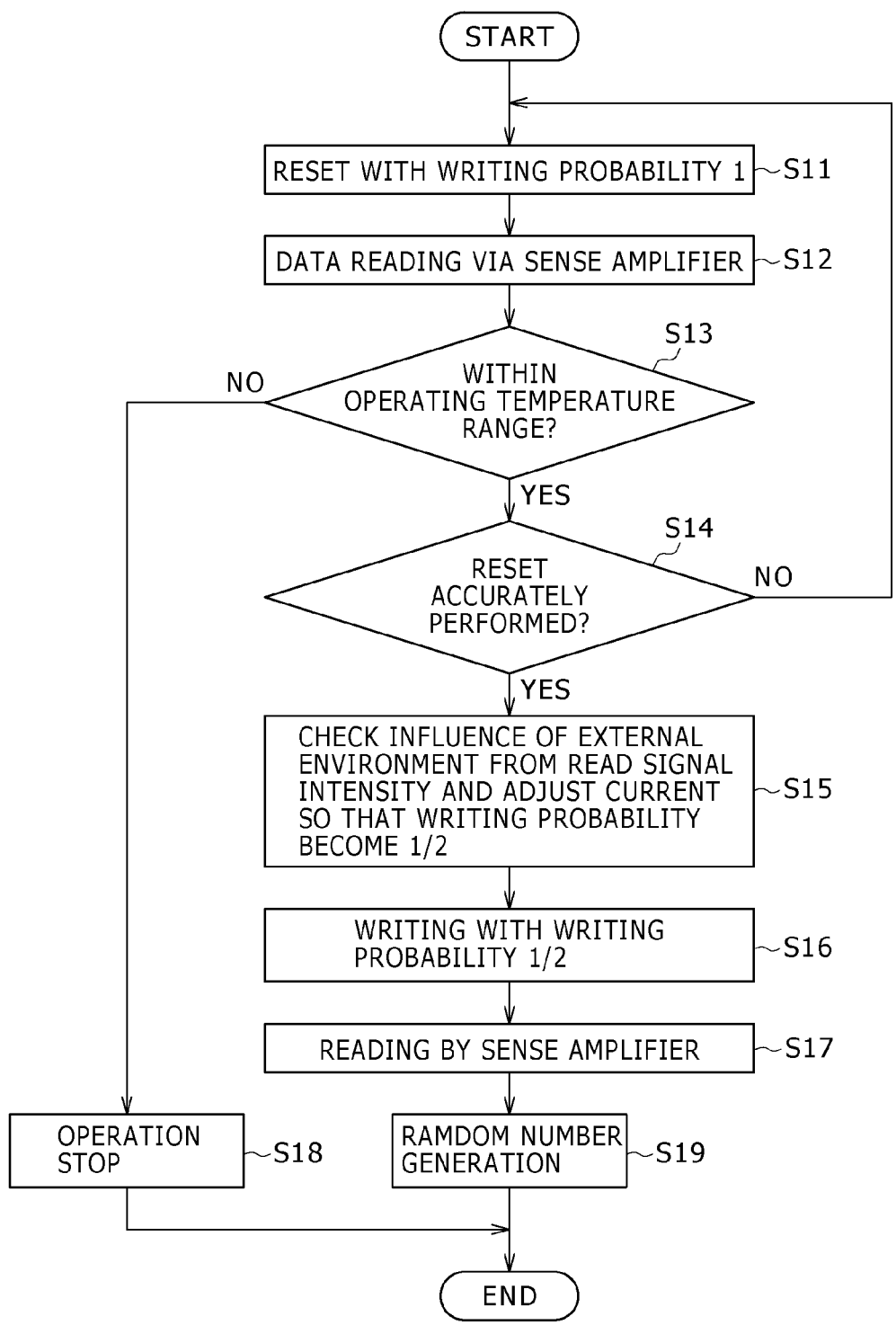
FIG. 5 is a flowchart showing an example of processing of generating a random number by using a decided random number generating element in the embodiment.

FIG. 5 is a diagram for explaining the processing of generating a random number by using the decided random number generating element 2a.

First, the write/read control circuit 36 performs reset by the first writing of supplying the random number generating element 2a with the spin-injection current that provides 1 as the writing probability and sets the resistance value of the random number generating element 2a to the first resistance value (higher-side resistance) higher than a predetermined threshold (step S11).

Next, the write/read control circuit 36 performs the first reading of reading out the resistance value of the random number generating element 2a, and makes the sense amplifier circuit 33 output data from the random number generating element 2a (step S12). The data output by the sense amplifier circuit 33 is sent to the temperature control circuit 39.

Next, the temperature control circuit 39 determines whether or not the current environmental temperature falls within the range of the operating temperature suitable for random number generation (step S13). Specifically, the temperature control circuit 39 obtains the environmental temperature of the environment under which the random number generating element 2a generates a random number from the resistance value of the random number generating element 2a, read out by the first reading. Subsequently, the temperature control circuit 39 makes the magnitude of the spin-injection current be so changed as to follow the environmental temperature, and makes the random number generating circuit 30a perform the second writing. If the environmental temperature is beyond the range of the operating temperature, the temperature control circuit 39 makes the random number generating circuit 30a stop the operation for generating a random number, to thereby end the processing (step S18).

If the environmental temperature is within the range of the operating temperature, the write/read control circuit 36 executes the following processing. Specifically, the write/read control circuit 36 determines that the reset has been accurately performed if the write/read control circuit 36 detects that the random number generating element 2a is set to the first resistance value by the first writing from the resistance value read out from the random number generating element 2a (step S14). If the reset has been inaccurately performed, the processing is moved to the step S11, where the write/read control circuit 36 repeats the reset operation (first writing).

If the reset has been accurately performed, the temperature control circuit 39 checks the influence of the external environment from the read signal intensity, and adjusts the current so that the writing probability may become ½ (step S15) to store the value of the adjusted current in the memory 40.

Next, the write/read control circuit 36 performs the second writing of supplying the random number generating element 2a with the spin-injection current that provides ½ as the writing probability and sets the resistance value of the random number generating element 2a to the second resistance value (lower-side resistance) lower than the predetermined threshold (step S16).

Next, the write/read control circuit 36 reads out data and makes the data be output from the random number generating element 2a by the sense amplifier circuit 33 (step S17). Subsequently, the cryptographic processor 4 uses the read data as a random number (step S19) to execute data encryption processing and so forth.

In general, a random number is generated by repeatedly performing first writing (step S11)-second writing (step S16)-reading (step S17). However, the write/read control circuit 36 of the present example performs the reading for checking that the random number generating element 2a is set to the high resistance between the first writing and the second writing. Therefore, the number of times of reading is two, which is larger than the number of times of reading in a normal random number generation sequence. Thus, the speed of the random number generation is slightly lower. However, the accuracy of the random number generation can be greatly enhanced and the operable temperature range can be greatly widened.

To actually generate a random number more accurately, the first writing (reset) should surely succeed. Therefore, by the first reading, the write/read control circuit 36 checks that the writing of the random number generating element 2a to the higher resistance side has succeeded by reading out the resistance of the spin-injection magnetization reversal element. If the writing has not succeeded and the occurrence of reset failure in the random number generating element 2a is detected, the first writing is performed again. Thereby, the random number generating element 2a can be surely set to the higher-resistance side with the writing probability set to 1. This can perfectly prevent the lowering of the randomness due to reset failure, and allows the random number generating element 2a to generate a random number having favorable randomness.

Figure 6:
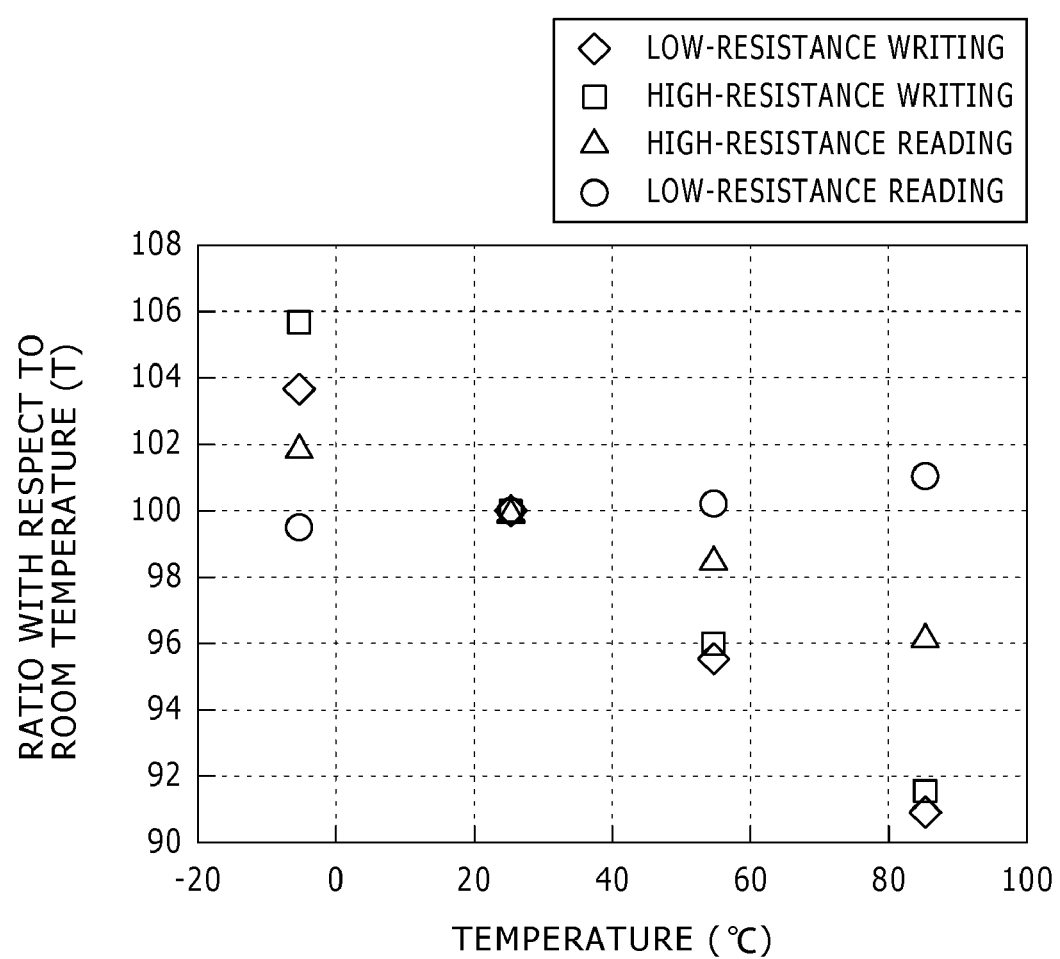
FIG. 6 is an explanatory diagram showing an example of the relationship between the temperature in writing or reading and the ratio with respect to room temperature in the low resistance state or the high resistance state in the embodiment.

FIG. 6 shows an example of the relationship between the temperature in writing or reading and the ratio with respect to a room temperature in the state in which the random number generating elements 2a and 2b have low resistance or high resistance.

To check whether the current temperature falls within the range of the operable temperature in the step S13 in FIG. 5, the relationship in which the resistance and the current that provides ½ as the writing probability change linearly with the temperature ($T=\alpha(R-R0)$) is used. Based on this relationship, the temperature control circuit 39 can get to know the environmental temperature T by checking how much the difference between the actual resistance R and the resistance R0 of the room temperature is. Therefore, as shown by the step S18, the operation of the security switch 1 can be stopped if the environmental temperature is outside the operation guarantee temperature range.

Furthermore, in order that the magnitude of the current by which the second writing is performed may be so changed as to follow temperature change ($T=\beta(I-I_0)$), the temperature control circuit 39 checks the environmental temperature T from variation of the higher-side resistance with temperature, and stores the environmental temperature T in the memory 40. This allows the write/read control circuit 36 to change the current for the second writing ($I_0+\alpha/\beta(R-R_0)$) based on the magnitude of the current read from the memory 40. Thus, the security chip 1 can encrypt data by using a random number accurately generated within the operation guarantee temperature range defined by the security chip 1 in advance.

The point to which attention should be paid is that the lower-side resistance hardly changes with temperature in data reading from the random number generating element 2a by the write/read control circuit 36. Therefore, in random number generation, the environmental temperature can not be measured from variation of the resistance with temperature unless reading is performed after writing of the higher-side resistance is surely performed. In addition, attention should be paid to the fact that writing of the higher-side resistance of the random number generating element 2a in the first writing inevitably leads to writing of the lower-side resistance of the random number generating element 2a in the second writing.

Figure 7:
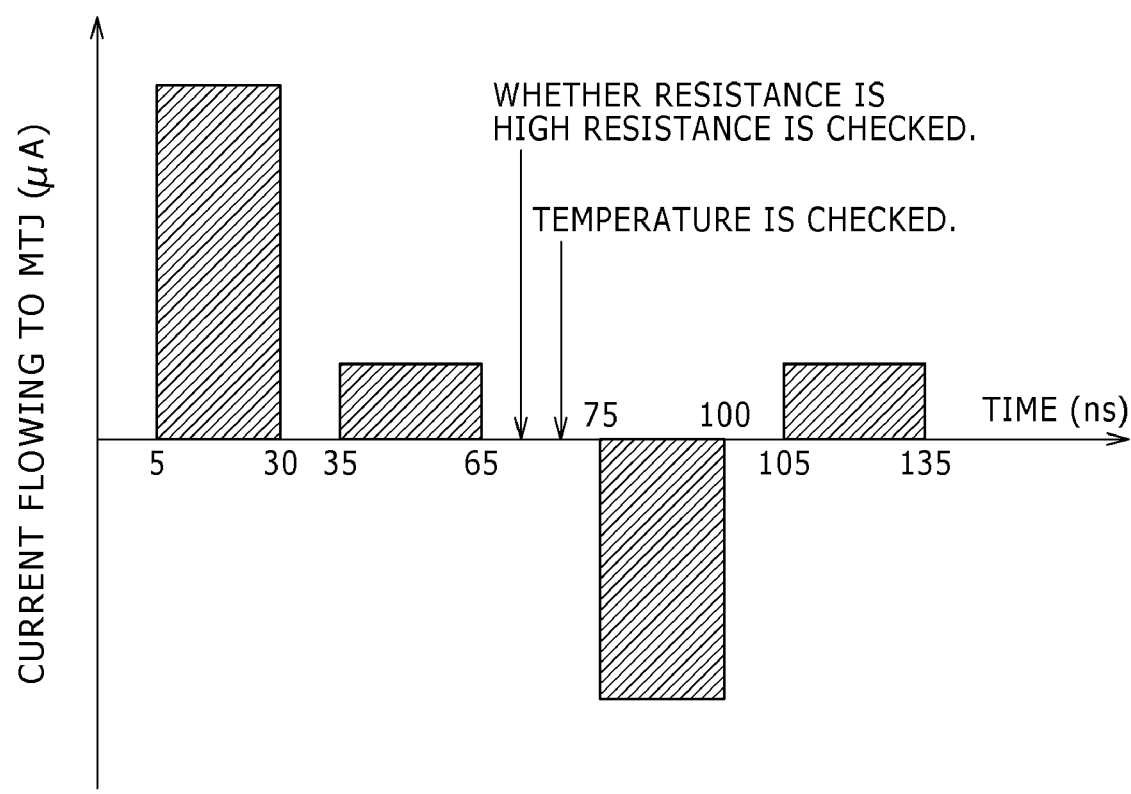
FIG. 7 is an explanatory diagram showing one example of the timings in the sequence of random number generation in the security chip of the embodiment.

FIG. 7 shows one example of the timings in the sequence of random number generation in the security chip 1.

In the diagram, the positive side indicates the current in the direction of writing of the higher-side resistance of the random number generating element 2a, and the negative side indicates the current in the direction of writing of the lower-side resistance of the random number generating element 2a. As described above, the spin-injection magnetization reversal element is set to the higher-side resistance in the first writing (reset) in order to roughly determine the environmental temperature in the next reading. Therefore, the write/read control circuit 36 applies a current to the positive side after the start of the sequence, i.e. at the elapse of 5 ns after the start of the sequence, with a pulse width of 25 ns.

At the elapse of 5 ns after the writing, the write/read control circuit 36 performs reading by applying a current in the positive direction with a pulse width of 30 ns without erroneous writing, and outputs data to the sense amplifier circuit 33. Furthermore, the temperature control circuit 39 checks that the environmental temperature falls within the operating temperature range of the security chip 1 and the resistance of the random number generating element 2a from which the reading is performed is regarded as the high resistance.

If the resistance and temperature pass the check, the write/read control circuit 36 applies a spin-injection current that provides ½ as the writing probability in the negative direction with a pulse width of 25 ns. At the elapse of 5 ns after the application of the spin-injection current, the write/read control circuit 36 performs reading by applying a current in the positive direction with a pulse width of 30 ns and outputs the data as a random number. In this sequence of random number generation, attention should be paid to the interval between the operations. If a spin-injection magnetization reversal element (magnetic tunnel junction (MTJ)) having poor retention characteristics is used, a long interval between the operations precludes the former operation from being guaranteed.

For example, if a long interval exists after the first reading, possibly the resistance is inverted to the low resistance by the time the next writing is performed although the temperature control circuit 39 has checked that the environmental temperature falls within the operation guarantee temperature range and the reset has been performed. In addition, also when a long interval exists after the second writing, it becomes impossible to ensure that the obtained data is surely the data resulting from writing with the writing probability ½. Therefore, it is preferable that the interval between the operations be as short as possible. In the present example, control is so carried out that the interval between the operations is at most 10 ns.

Figure 8:
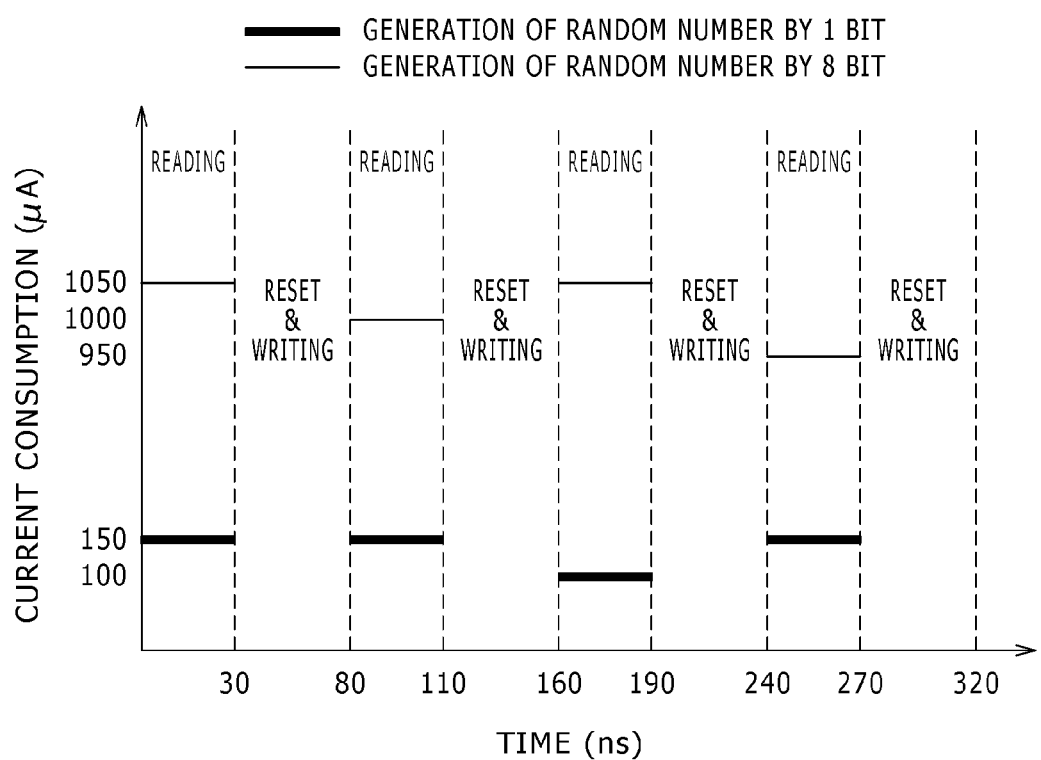
FIG. 8 is an explanatory diagram showing an example of the measurement result of the current consumption in generation of a 8-bit random number by spin injection in the embodiment and the measurement result of the current consumption in generation of a 1-bit random number in a related art.

FIG. 8 is an example of measurement results of the current consumption in random number generation by spin injection.

Specifically, FIG. 8 shows comparison between the measurement result of the current consumption in the case in which four sets of the random number generating elements 2a and 2b disposed in parallel (8 bits) are used and a 8-bit random number is generated and the measurement result of the current consumption in the case in which a 1-bit random number like that shown in patent document 1 is generated. However, the current consumption in reset and writing is omitted, and only the current consumption in reading in random number generation by the random number generating elements 2a and 2b is plotted in the graph.

The current consumption in generation of the 1-bit random number shown in patent document 1 differs by e.g. about 50 μA between the higher current consumption and the lower current consumption. Therefore, by measuring the current consumption, whether a random number of "0" or "1" is generated by the random number generating element can be easily found. However, if a 8-bit random number is generated, substantially 4 bits as the half of 8 bits will be "1" and the remaining 4 bits will be "0." Thus, although the entire current consumption differs within a range of about 100 μA, it is impossible to easily speculate which random number generating element generates a random number of "0" or "1" to contribute to increase/decrease in the current consumption.

For example, even if the number of bits of "0" is determined based on the difference in the current consumption, speculation from 8 Cn (n is the number of bits of "0") combinations is necessary to identify which bits among 8 bits are "0." Furthermore, speculation from {8 Cn}m (m is the number of times of consecutive random number generation) combinations is necessary to identify random numbers consecutively generated. Moreover, when the number of bits operated in parallel is larger, the number of combinations is larger. Thus, the risk of identification of the generated random number is extremely reduced, and the speed of the random number generation is also higher.

The security chip 1 according to the above-described embodiment includes the random number generator 2, which generates a random number by using the spin-injection phenomenon, and the memory 3. Furthermore, the plural random number generating elements 2a and 2b juxtaposed extremely close to each other are disposed among the storage elements 3a, and a random number is generated by using the random number generating elements 2a and 2b. The distance between the random number generating elements 2a and 2b and the storage element 3a is as short as e.g. 200 nm, and the random number generating elements 2a and 2b are randomly disposed inside the memory 3. Therefore, it is very difficult to seek the element used as the random number generating element by bringing a probe into contact with the elements. In this manner, the random number used as the key of encryption can be protected from analysis based on the power consumption and physical probing, and the security chip 1 having significantly-enhanced security and tamper resistance can be provided.

In the first writing (reset), the resistance of the random number generating elements 2a and 2b is set to high by writing a spin-injection current that provides 1 as the writing probability to the random number generating elements 2a and 2b. Subsequently, before the second writing (random number writing), it is determined that the resistance value read out from the random number generating elements 2a and 2b is the high resistance. Thus, the second writing can be performed after it is checked that the random number generating elements 2a and 2b are surely reset. This provides an advantageous effect that the randomness of the random number generated by the random number generating elements 2a and 2b is enhanced.

The random number generator 2 includes plural random number generating elements and can generate a random number of plural bits in parallel. At this time, because the reversal probability of the random number generating element is ½, the current consumption hardly varies in each operation to generate a random number. Therefore, it is extremely difficult for an attacker to get to know which random number generating element generates which random number even by checking the power consumption of the security chip 1. Furthermore, a random number is generated by using the plural random number generating elements. Therefore, the time required to generate each one random number is slightly longer when the read time is taken into consideration. However, the time required for generation of plural random numbers obtained as a result is shorter than that in the random number generating device of the related art. Consequently, there is an advantageous effect that the speed of the random number generation can be enhanced compared with the related art.

The temperature control circuit 39 obtains the environmental temperature in generation of a random number by the random number generating element based on variation of the higher-side resistance of the random number generating elements 2a and 2b with temperature, read out after the first writing (reset). Subsequently, the temperature control circuit 39 stores in the memory 40 the magnitude of the spin-injection current that is so adjusted as to follow the environmental temperature and the write/read control circuits 36 and 37 can perform the second writing with the magnitude of the spin-injection current read out from the memory 40. Therefore, the magnitude of the spin-injection current can be so changed as to follow the environmental temperature, and a random number generated by the random number generating elements 2a and 2b can be stabilized.

If the write/read control circuits 36 and 37 detect reset failure from the resistance values of the random number generating elements 2a and 2b read out after the first writing (reset), they perform the first writing for the random number generating elements 2a and 2b again. Thus, the random number generating elements 2a and 2b can be surely reset, which can enhance the reliability of a random number generated in the subsequent random number generation processing.

Even if an attacker attempts to generate a random number at a temperature outside the temperature range in which the operation of the security chip 1 is guaranteed, the random number generation can be stopped because the environmental temperature is obtained by the temperature control circuit 39. This feature allows proper defense against e.g. an attack of biasing a random number generated by the random number generating element toward a specific value by changing the environmental temperature.

2. MODIFICATION EXAMPLE

It is also possible to detect whether the random number generating elements 2a and 2b are in the high resistance state or the low resistance state by using the magnetic field angle and the resistance difference ratio of the random number generating elements 2a and 2b.

Figure 9:
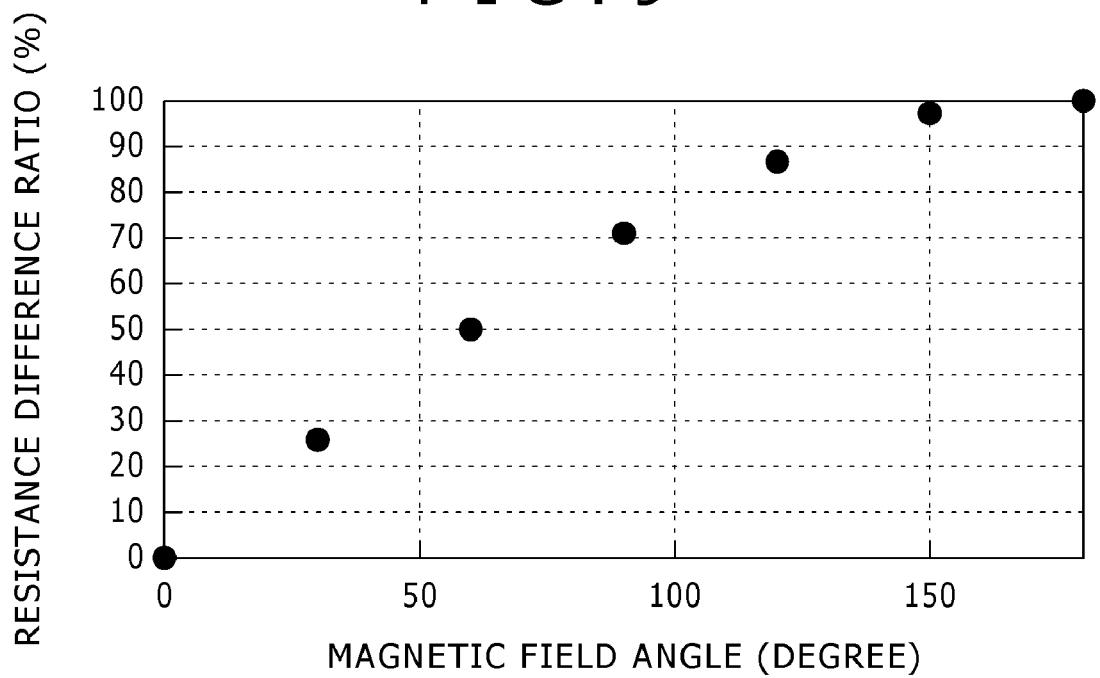
FIG. 9 is an explanatory diagram showing an example of the relationship between the magnetic field angle and the resistance difference ratio in another embodiment.

FIG. 9 shows an example of the relationship between the magnetic field angle and the resistance difference ratio.

The magnetic field angle refers to the angle of the signal detecting layer and the magnetization pinned layer. The resistance difference refers to the difference between the first resistance value (higher-side resistance) and the second resistance value (lower-side resistance). The resistance difference ratio refers to the value that is so set that the difference between the high resistance and the low resistance is defined as 100%.

This diagram shows that the resistance difference ratio becomes higher as the magnetic field angle becomes larger. For example, if the magnetic field angle is 0 degrees, the resistance difference ratio is 0% and thus the resistance does not change (low resistance). If the magnetic field angle is 180 degrees, the resistance difference ratio is 100% and thus the resistance is changed to the double value (high resistance).

In this manner, the write/read control circuits 36 and 37 determine whether the resistance value read out from the random number generating elements 2a and 2b is the first or second resistance value (higher-side resistance or lower-side resistance) based on the magnetic field angle and the ratio of the resistance difference. Thus, the reliability of the respective operations in the first writing (reset), the first reading, and the second writing (random number generation) is enhanced, and a random number having high randomness can be generated.

;It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A random number generating device comprising:
a random number generator configured to have a plurality of random number generating elements that generate a random number through setting of reversal probability of magnetization to ½ due to a spin-injection phenomenon in response to supply of a spin-injection current, the random number generator making the random number generating element generate the random number by performing first writing of supplying the random number generating element with the spin-injection current that provides 1 as writing probability and sets a resistance value of the random number generating element to a first resistance value higher than a predetermined threshold, and performing first reading of reading out the resistance value of the random number generating element, and performing second writing of supplying the random number generating element with the spin-injection current that provides ½ as writing probability and sets the resistance value of the random number generating element to a second resistance value lower than the predetermined threshold if setting of the random number generating element to the first resistance value by the first writing is detected from the resistance value that is read out; and
a temperature controller configured to obtain an environmental temperature of an environment under which the random number generating element generates a random number based on the resistance value of the random number generating element, read out by the first reading, and make magnitude of the spin-injection current be so changed as to follow the environmental temperature to make the random number generator perform the second writing.

2. The random number generating device according to claim 1, wherein
the random number generator determines whether a resistance value read out from the random number generating element is the first or second resistance value based on a magnetic field angle obtained from an angle of a signal detecting layer and a magnetization pinned layer included in the random number generating element and a ratio of a resistance difference obtained from the resistance difference as difference between the first resistance value and the second resistance value.

3. The random number generating device according to claim 1, wherein
the random number generator supplies the plurality of random number generating elements with the spin-injection current that aligns reversal probability of the random number generating element with about ½ by using a value of the spin-injection current that provides ½ as the reversal probability of the random number generating element, stored in a non-volatile memory in advance.

4. The random number generating device according to claim 1, wherein
the random number generator performs the first writing again if occurrence of reset failure in the random number generating element is detected by the first reading.

5. The random number generating device according to claim 1, wherein
the temperature controller makes the random number generator stop generation of a random number if the environmental temperature is beyond a predetermined temperature range.

6. The random number generating device according to claim 1, further comprising
a memory configured to have a plurality of storage elements for storing data, wherein
the storage elements and the random number generating elements are randomly disposed inside the memory.

7. A random number generating method comprising the steps of:
preparing a plurality of random number generating elements that generate a random number through setting of reversal probability of magnetization to ½ due to a spin-injection phenomenon in response to supply of a spin-injection current, and making the random number generating element generate the random number by performing first writing of supplying the random number generating element with the spin-injection current that provides 1 as writing probability and sets a resistance value of the random number generating element to a first resistance value higher than a predetermined threshold, and performing first reading of reading out the resistance value of the random number generating element, and performing second writing of supplying the random number generating element with the spin-injection current that provides ½ as writing probability and sets the resistance value of the random number generating element to a second resistance value lower than the predetermined threshold if setting of the random number generating element to the first resistance value by the first writing is detected from the resistance value that is read out; and
obtaining an environmental temperature of an environment under which the random number generating element generates a random number based on the resistance value of the random number generating element, read out by the first reading, and making magnitude of the spin-injection current be so changed as to follow the environmental temperature to make a random number generator perform the second writing.

8. A security chip comprising:
a random number generator configured to have a plurality of random number generating elements that generate a random number through setting of reversal probability of magnetization to ½ due to a spin-injection phenomenon in response to supply of a spin-injection current, the random number generator making the random number generating element generate the random number by performing first writing of supplying the random number generating element with the spin-injection current that provides 1 as writing probability and sets a resistance value of the random number generating element to a first resistance value higher than a predetermined threshold, and performing first reading of reading out the resistance value of the random number generating element, and performing second writing of supplying the random number generating element with the spin-injection current that provides ½ as writing probability and sets the resistance value of the random number generating element to a second resistance value lower than the predetermined threshold if setting of the random number generating element to the first resistance value by the first writing is detected from the resistance value that is read out;
a temperature controller configured to obtain an environmental temperature of an environment under which the random number generating element generates a random number based on the resistance value of the random number generating element, read out by the first reading, and make magnitude of the spin-injection current be so changed as to follow the environmental temperature to make the random number generator perform the second writing;
a cryptographic processor configured to use the random number generated by the random number generator as a pseudo random number and encrypt data by the pseudo random number based on a predetermined encryption system; and
a memory configured to have a plurality of storage elements for storing the encrypted data.

9. A random number generating device comprising:
random number generation means having a plurality of random number generating elements that generate a random number through setting of reversal probability of magnetization to ½ due to a spin-injection phenomenon in response to supply of a spin-injection current, the random number generation means making the random number generating element generate the random number by performing first writing of supplying the random number generating element with the spin-injection current that provides 1 as writing probability and sets a resistance value of the random number generating element to a first resistance value higher than a predetermined threshold, and performing first reading of reading out the resistance value of the random number generating element, and performing second writing of supplying the random number generating element with the spin-injection current that provides ½ as writing probability and sets the resistance value of the random number generating element to a second resistance value lower than the predetermined threshold if setting of the random number generating element to the first resistance value by the first writing is detected from the resistance value that is read out; and temperature control means for obtaining an environmental temperature of an environment under which the random number generating element generates a random number based on the resistance value of the random number generating element, read out by the first reading, and making magnitude of the spin-injection current be so changed as to follow the environmental temperature to make the random number generator perform the second writing.

* * * * *